(12) United States Patent
Morohashi (10) Patent No.: US 12,326,608 B2
(45) Date of Patent: Jun. 10, 2025

(54) OPTICAL APPARATUS CAPABLE OF BEING MINIATURIZED

(71) Applicant: CANON KABUSHIKI KAISHA, Tokyo (JP)

(72) Inventor: Mitsuru Morohashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 534 days.

(21) Appl. No.: 17/879,241

(22) Filed: Aug. 2, 2022

(65) Prior Publication Data

US 2023/0051012 A1 Feb. 16, 2023

(30) Foreign Application Priority Data

Aug. 11, 2021 (JP) .................................. 2021-131300

(51) Int. Cl.
*G02B 7/02* (2021.01)
*G02B 7/09* (2021.01)
*G02B 13/00* (2006.01)

(52) U.S. Cl.
CPC .............. *G02B 7/021* (2013.01); *G02B 7/09* (2013.01); *G02B 13/0035* (2013.01)

(58) Field of Classification Search
CPC ...... G02B 7/021; G02B 7/09; G02B 13/0035; G02B 7/026; G02B 7/102; G02B 15/1461; G02B 27/646; G03B 2205/0046; G03B 2205/0053; G03B 3/10; G03B 5/00; G03B 17/12; G03B 2205/0007
See application file for complete search history.

(56) References Cited

U.S. PATENT DOCUMENTS

| | | | |
|---|---|---|---|
| 5,978,598 A | 11/1999 | Ishikawa | |
| 9,678,357 B2 * | 6/2017 | Takeuchi | G02B 27/646 |
| 2016/0073027 A1 | 3/2016 | Noguchi | |

FOREIGN PATENT DOCUMENTS

| | | |
|---|---|---|
| JP | 2018-105899 A | 7/2018 |
| JP | 2018-128610 A | 8/2018 |

OTHER PUBLICATIONS

The documents were cited in a Dec. 22, 2022 European Search Report, which is enclosed, that Issued in European Patent Application No. 22189206.0.

* cited by examiner

*Primary Examiner* — James C. Jones
(74) *Attorney, Agent, or Firm* — Cowan, Liebowitz & Latman, P.C.

(57) ABSTRACT

An optical apparatus which is capable of being miniaturized is provided. The optical apparatus includes a lens unit, a drive unit configured to include a base member, a shift member, and an urging member, a cylindrical body configured to support the drive unit, and a first coupling portion configured to be coupled with the urging member. A groove along a direction of an optical axis of the lens unit is provided inside the cylindrical body. The urging member urges the shift member with respect to the base member. The first coupling portion and the groove overlap with each other when viewed from the direction of the optical axis.

17 Claims, 9 Drawing Sheets

OPTICAL APPARATUS CAPABLE OF BEING MINIATURIZED

BACKGROUND OF THE INVENTION

Field of the Invention

The present invention relates to an optical apparatus.

Description of the Related Art

Optical apparatuses include, for example, digital cameras, video cameras, interchangeable lenses, and the like. Some such optical apparatuses are equipped with an image stabilization drive unit, which is capable of reducing an image blur due to a camera shake by a user that occurs during exposure or displaying a through image by moving a lens image stabilization group including a lens in a direction perpendicular to an optical axis of the lens. The image stabilization drive unit moves the lens image stabilization group to a target position perpendicular to the optical axis based on a shake signal in a pitch direction and a shake signal in a yaw direction when an image blur occurs. By this movement, a camera shake that caused the image blur is offset, and as a result, it becomes possible to reduce the image blur. As the configuration of the image stabilization drive unit, for example, a configuration is known having a base member that moves in an optical axis direction, a shift member that movably supports the lens in the direction perpendicular to the optical axis, and a coil spring that urges the shift member with respect to the base member. Further, some image stabilization drive units include rolling balls that are disposed between the base member and the shift member. In some cases, the size of the optical apparatus is determined by the way of arranging the members constituting the image stabilization drive unit. Japanese Laid-Open Patent Publication (kokai) No. 2018-105899 discloses a lens barrel, in which rolling balls between a base member and a shift member, and a coil spring are disposed so as to overlap with each other when viewed from the optical axis direction in order to realize miniaturizing.

The lens barrel disclosed in Japanese Laid-Open Patent Publication (kokai) No. 2018-105899 requires support portions that support both end portions of the coil spring, respectively. Further, in some cases, the miniaturization (reducing the diameter) of the lens barrel is hindered particularly depending on a position of the support portion that supports the end portion of the coil spring located distal to the optical axis among these support portions.

SUMMARY OF THE INVENTION

The present invention provides an optical apparatus which is capable of being miniaturized.

Accordingly, the present invention provides an optical apparatus comprising a lens unit, a drive unit configured to include a base member, a shift member, and an urging member, a cylindrical body configured to support the drive unit, and a first coupling portion configured to be coupled with the urging member, and wherein a groove along a direction of an optical axis of the lens unit is provided inside the cylindrical body, the urging member urges the shift member with respect to the base member, and the first coupling portion and the groove overlap with each other when viewed from the direction of the optical axis.

According to the present invention, it is possible to realize the miniaturization of the optical apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, a preferred embodiment of the present invention will be described in detail with reference to FIGS. 1A to 9. However, the configuration described in the following preferred embodiment is merely an example, and the scope of the present invention is not limited by the configuration described in the following preferred embodiment. In the present preferred embodiment, as one example, a case that an optical apparatus is applied to a lens barrel of a digital camera will be described. Furthermore, the optical apparatus is not limited to being applied to a lens barrel, and can be applied to, for example, a lens-integrated camera (such as a digital camera or a video camera) or the like. A digital camera 100 shown in FIGS. 1A and 1B includes a camera body 1, and an interchangeable lens 101 as a lens barrel that is detachably attached to the camera body 1. In the present preferred embodiment, an optical axis direction, in which an optical axis OA of an image pickup optical system housed in the interchangeable lens 101 extends, is defined as an X-axis direction, and directions perpendicular to the X-axis direction are defined as a Z-axis direction (a horizontal direction) and a Y-axis direction (a vertical direction). Hereinafter, in some cases, the Z-axis direction and the Y-axis direction is collectively referred to as "a Z/Y-axis direction". Further, a rotation direction around the Z-axis is defined as a pitch direction, a rotation direction around the X-axis is defined as a roll direction, and a rotation direction around the Y-axis is defined as a yaw direction. Furthermore, the pitch direction and the yaw direction (hereinafter, in some cases, collectively referred to as "a pitch/yaw direction") are rotation directions around two axes, which are the Z-axis and the Y-axis that are perpendicular to each other.

Figure 1A:
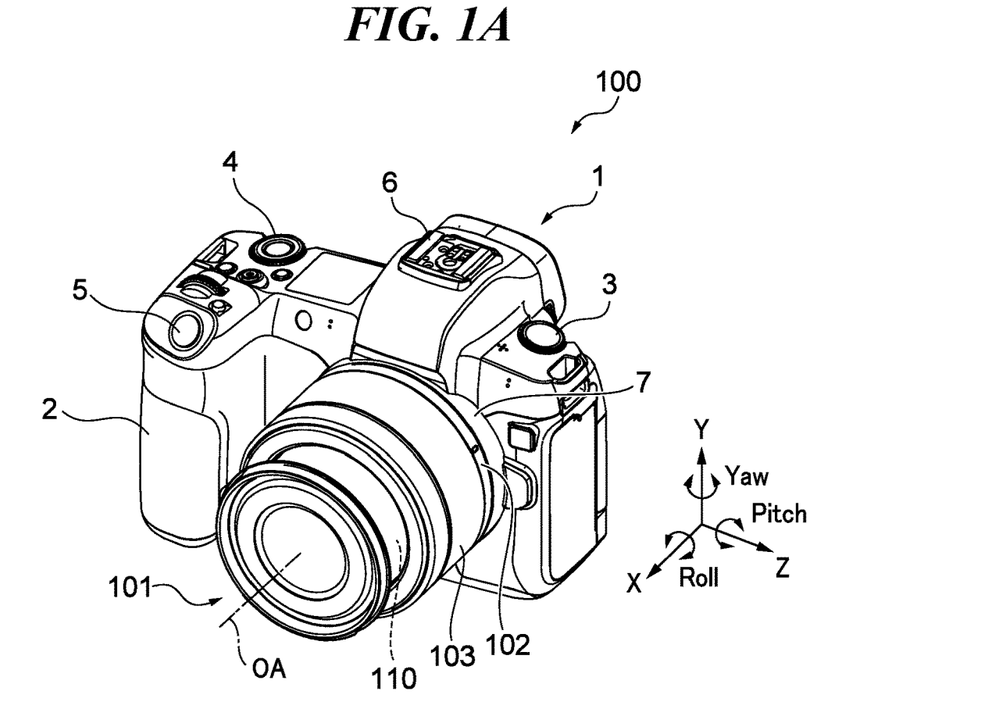
FIG. 1A is a front perspective view in a case that an optical apparatus according to the present invention is applied to a lens barrel of a digital camera.

As shown in FIG. 1A, the camera body 1 is provided with a grip portion 2 for a user to grip the camera body 1 by hand on a portion on the left side when viewed from the front (on the right side when viewed from the back). Further, a power supply operation unit 3 is provided on an upper surface portion of the camera body 1. When the user operates the power supply operation unit 3 while the camera body 1 is in a power-off state, energization is started. As a result, the power of the camera body 1 is turned on (the camera body 1 becomes a power-on state), a computer program such as an origin detection processing of a focus group is executed, and a photographing standby state is set. On the other hand, when the user operates the power supply operation unit 3 while the camera body 1 is in the power-on state, the energization is stopped. As a result, the power of the camera body 1 is turned off (the camera body 1 becomes the power-off state). In addition to the power supply operation unit 3, a mode dial 4, a release button 5, and an accessory shoe 6 are provided on the upper surface portion of the camera body 1. It is possible to switch among a plurality of photographing modes by the user rotationally operating the mode dial 4. The plurality of photographing modes includes a manual still image photographing mode, an automatic still image photographing mode, and a moving image photographing mode. The manual still image photographing mode is a mode in which the user can arbitrarily set photographing conditions such as a shutter speed and an aperture value. Further, the automatic still image photographing mode is a mode in which an appropriate exposure amount can be automatically obtained. Furthermore, the moving image photographing mode is a mode for performing moving image photographing. By half-pressing the release button 5, the user can instruct a photographing preparation operation such as an autofocus operation or an automatic exposure control operation. Further, by full-pressing the release button 5, the user can instruct photographing. Various kinds of accessories such as an external flash can be detachably attached to the accessory shoe 6.

A camera mount 7 is provided on a front surface portion of the camera body 1. The interchangeable lens 101 is mechanically and electrically connected to the camera body 1 by attaching a lens mount 102 to the camera mount 7. The image pickup optical system, which forms a subject image by image-forming a light from a subject, is housed within the interchangeable lens 101. A zoom operation ring 103 capable of rotating about the optical axis OA is provided on an outer peripheral portion of the interchangeable lens 101. When the zoom operation ring 103 is rotationally operated by the user, a zoom group 110 constituting the image pickup optical system moves to a predetermined use position corresponding to an angle of the zoom operation ring 103. This allows the user to perform photographing at a desired angle of view.

Figure 1B:
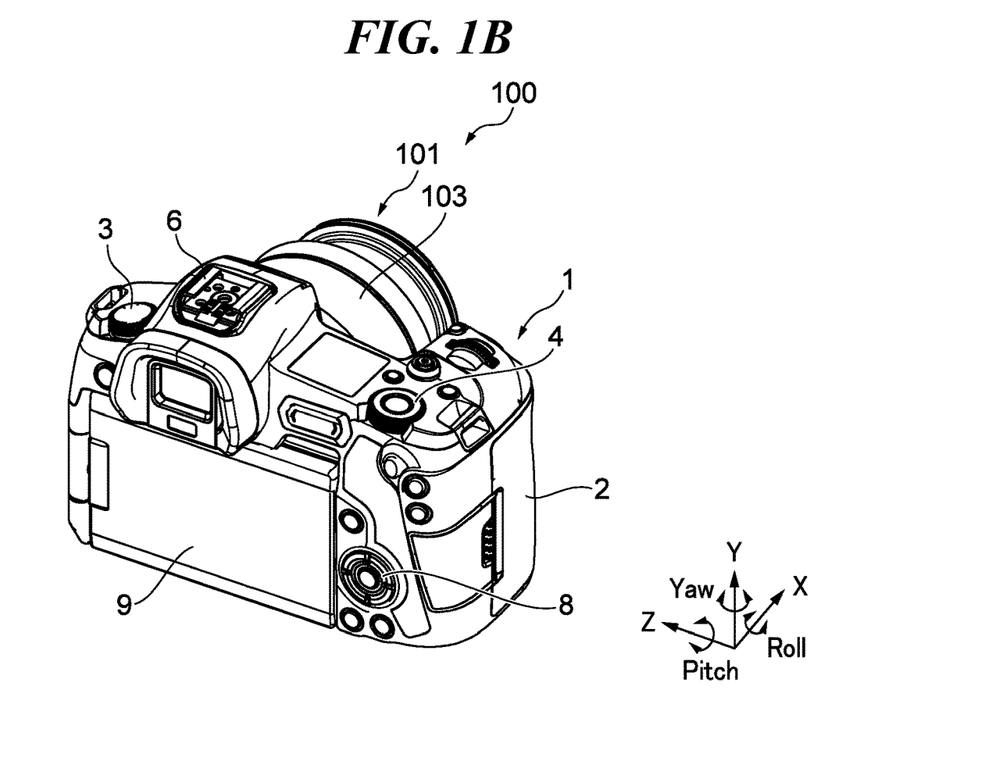
FIG. 1B is a rear perspective view in the case that the optical apparatus according to the present invention is applied to the lens barrel of the digital camera.

As shown in FIG. 1B, a rear operation unit 8 and a display unit 9 are provided on the back surface of the camera body 1. The rear operation unit 8 includes a plurality of buttons and dials to which various kinds of functions related to photographing are assigned. For example, the rear operation unit 8 includes a reproducing button for instructing reproducing of photographed images that are stored in a storage unit 13 described later or are recorded on a recording medium (not shown). When the power of the camera body 1 is turned on (the camera body 1 is in the power-on state) and the moving image photographing mode or each of the still image photographing modes is set, the display unit 9 displays a through image of the subject image that is picked up by an image pickup element 16 described later. Further, photographing parameters, which indicate the photographing conditions such as the shutter speed and the aperture value, are displayed on the display unit 9. As a result, the user can change setting values of the photographing parameters by operating the rear operation unit 8, while checking the photographing parameters. Further, by operating the reproducing button of the rear operation unit 8, the display unit 9 reproducing-displays the photographed images that are stored in the storage unit 13 or are recorded on the recording medium. Furthermore, the display unit 9 can also display image signals (the through image) outputted from an image processing unit 17 described later.

Figure 2:
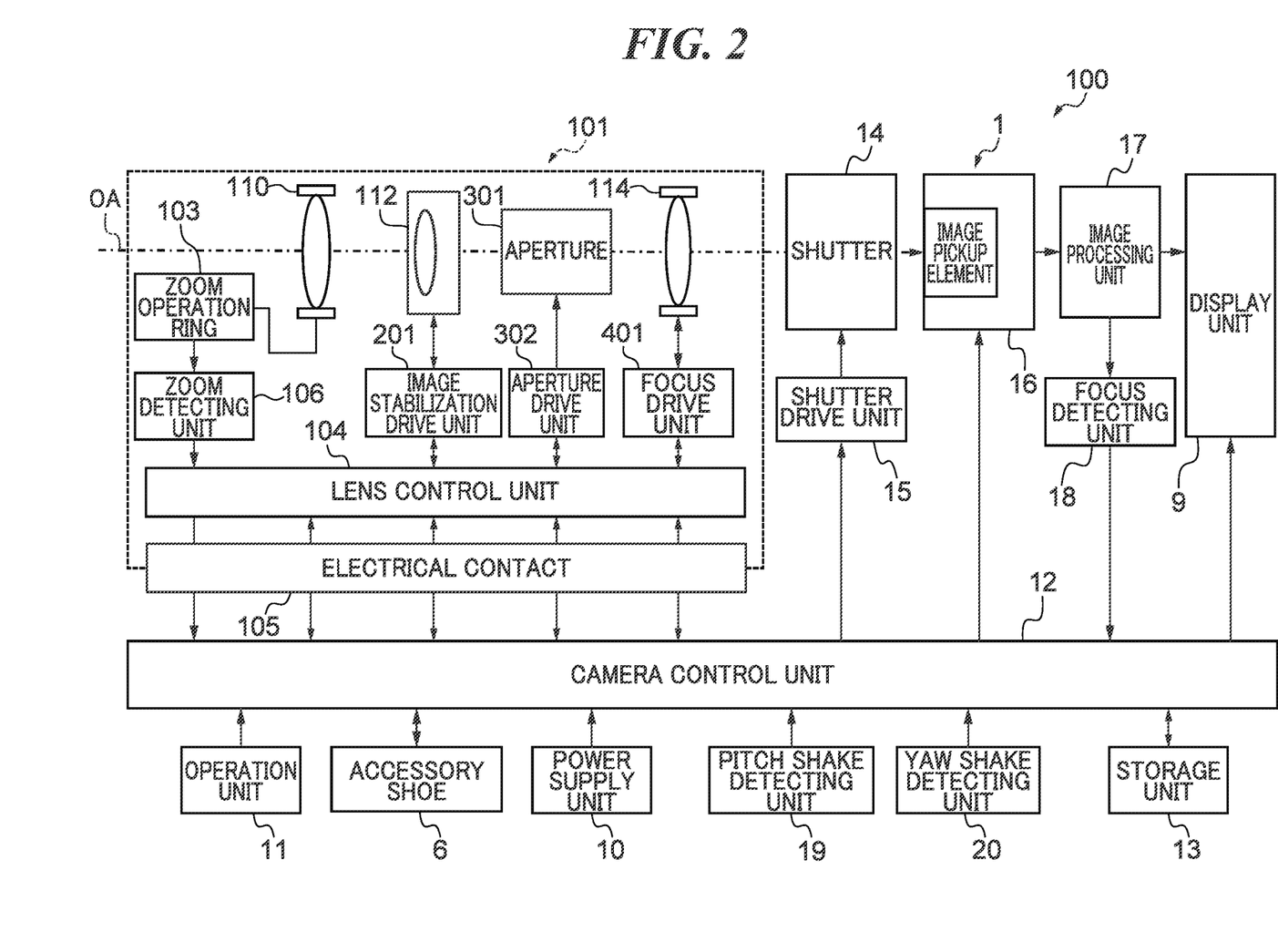
FIG. 2 is a block diagram that shows the electrical and optical configuration of the digital camera shown in FIGS. 1A and 1B.

As shown in FIG. 2, the camera body 1 includes a power supply unit 10 that supplies electric power to the camera body 1 and the interchangeable lens 101, the above-described power supply operation unit 3, the above-described mode dial 4, the above-described release button 5, the above-described rear operation unit 8, and an operation unit 11 that includes the display unit 9 having a touch panel function. The camera body 1 is provided with a camera control unit 12 and the storage unit 13, and the interchangeable lens 101 is provided with a lens control unit 104. The control of the camera body 1 and the interchangeable lens 101 as a whole system is performed by the camera control unit 12 and the lens control unit 104 cooperating with each other. The camera control unit 12 reads out a computer program stored in the storage unit 13 and executes it. At that time, the camera control unit 12 communicates with the lens control unit 104 via a communication terminal of an electrical contact 105 provided on the lens mount 102 (transmits/receives various kinds of control signals, various kinds of data, etc. to/from the lens control unit 104). Further, the electrical contact 105 includes a power supply terminal that supplies the electric power from the above-described power supply unit 10 to the interchangeable lens 101.

The image pickup optical system of the interchangeable lens 101 includes the zoom group 110, which is coupled with the zoom operation ring 103 and moves in the optical axis direction to change the angle of view, and a lens image stabilization group 112 that includes a shift lens as an image stabilization element. By the lens image stabilization group 112 moving (shifting) in the Z/Y axis direction perpendicular to the optical axis OA, the image blur due to the camera shake by the user is reduced. In addition, the image pickup optical system includes an aperture group 301 that performs a light amount adjusting operation, and a focus group 114 that includes a focus lens that moves in the optical axis direction to perform focus adjustment. Further, the interchangeable lens 101 includes an image stabilization drive unit (a drive unit) 201 that moves the lens image stabilization group 112, an aperture drive unit 302 that drives the aperture group 301, and a focus drive unit 401 that moves the focus group 114.

The focus drive unit 401 includes a focus motor (not shown), and a photointerrupter (not shown) that detects the origin position of the focus group 114. Generally, as the focus motor, a stepping motor, which is a kind of actuator, is often adopted. Moreover, since the stepping motor can control only a relative drive amount, there is a possibility that the current position of the focus group 114 becomes indefinite when the power of the camera body 1 is turned off (the camera body 1 is in the power-off state). Further, even when the power of the camera body 1 is turned on (the camera body 1 remains in the power-on state), in some cases, the power supply (the energization) from the camera body 1 to the interchangeable lens 101 is interrupted, for example, by detaching the interchangeable lens 101 from the camera body 1. In this case, there is a possibility that the position of the focus group 114 when the power supply (the energization) is cut off is held, and the position detection becomes impossible. When the user operates the power supply operation unit 3 to turn on the power of the camera body 1 from such a state where the current position of the focus group 114 is indefinite, before reaching the photographing standby state, the focus group 114 must first be moved to the origin position, and the origin detection processing must be executed. Since the control of the origin detection processing is a publicly known technique, the description thereof is omitted here. Moreover, the actuator used in the focus motor may be, for example, a DC motor having an encoder, an ultrasonic motor, or the like. Further, the photointerrupter for detecting the origin position of the focus group 114 may be a light transmission type or a light reflection type. Furthermore, as the photointerrupter, a brush that comes into contact with a conductive pattern and electrically detects signals may be used.

The camera body 1 includes a shutter 14, a shutter drive unit 15, the image pickup element 16, the image processing unit 17, and a focus detecting unit 18. The shutter 14 controls the amount of light that is image-formed by the image pickup optical system within the interchangeable lens 101 and is exposed by the image pickup element 16. The image pickup element 16 photoelectrically converts the subject image formed by the image pickup optical system and outputs image pickup signals. The image processing unit 17 performs various kinds of image processes with respect to the image pickup signals, and then generates the image signals.

The camera control unit 12 controls the focus drive unit 401 in response to the photographing preparation operation (such as a half-pressing operation of the release button 5) in the operation unit 11. For example, when the autofocus operation is instructed, the focus detecting unit 18 judges a focusing state of the subject image image-formed by the image pickup element 16 based on the image signals generated by the image processing unit 17, generates a focus signal, and transmits the focus signal to the camera control unit 12. Along with this, the focus drive unit 401 transmits information regarding the current position of the focus group 114 to the camera control unit 12. The camera control unit 12 compares the focusing state of the subject image with the current position of the focus group 114, calculates a focus drive amount based on the defocus amount, and transmits the focus drive amount to the lens control unit 104. Further, the lens control unit 104 moves the focus group 114 to a target position in the optical axis direction via the focus drive unit 401, and corrects the defocus of the subject image.

Further, the camera control unit 12 controls the drive of the aperture group 301 and the shutter 14 via the aperture drive unit 302 and the shutter drive unit 15 according to the setting values of the aperture value and the shutter speed, which are received from the operation unit 11. For example, when the automatic exposure control operation is instructed, the camera control unit 12 receives luminance signals generated by the image processing unit 17 and performs a photometry calculation. The camera control unit 12 controls the aperture drive unit 302 based on the result of the photometry calculation. Along with this, the camera control unit 12 controls the drive of the shutter 14 via the shutter drive unit 15 and performs an exposure process by the image pickup element 16.

The camera body 1 includes a pitch shake detecting unit 19 and a yaw shake detecting unit 20 that function as shake detecting means capable of detecting the image blur due to the camera shake by the user. The pitch shake detecting unit 19 and the yaw shake detecting unit 20 include an angular velocity sensor (a vibrating gyro) and an angular acceleration sensor, respectively. The pitch shake detecting unit 19 detects an image blur (due to a camera shake) in the pitch direction (the rotation direction around the Z-axis) and outputs a shake signal. Further, the yaw shake detecting unit 20 detects an image blur (due to a camera shake) in the yaw direction (the rotation direction around the Y-axis) and outputs a shake signal. The camera control unit 12 calculates a shift position of the lens image stabilization group 112 in the Y-axis direction by using the shake signal outputted from the pitch shake detecting unit 19. Similarly, the camera control unit 12 calculates a shift position of the lens image stabilization group 112 in the Z-axis direction by using the shake signal outputted from the yaw shake detecting unit 20. Then, by the camera control unit 12 operating the image stabilization drive unit 201 via the lens control unit 104, the camera control unit 12 moves the lens image stabilization group 112 to the target position in the Z/Y axis direction according to the shift positions in the pitch/yaw direction calculated above. As a result, the image blur that occurs during the exposure or displaying the through image is reduced.

The interchangeable lens 101 includes the zoom operation ring 103 for changing the angle of view of the image pickup optical system, and a zoom detecting unit 106 that detects the angle of the zoom operation ring 103. The zoom detecting unit 106 detects the angle of the zoom operation ring 103, which is operated by the user, as an absolute value. As the zoom detecting unit 106, for example, a resistance type linear potentiometer may be used. Further, information regarding the angle detected by the zoom detecting unit 106 is transmitted to the lens control unit 104, and is reflected in various kinds of controls performed by the camera control unit 12. Further, a part of such various kinds of information is stored in the storage unit 13 or is recorded on the recording medium, together with the photographed images.

Figure 3:
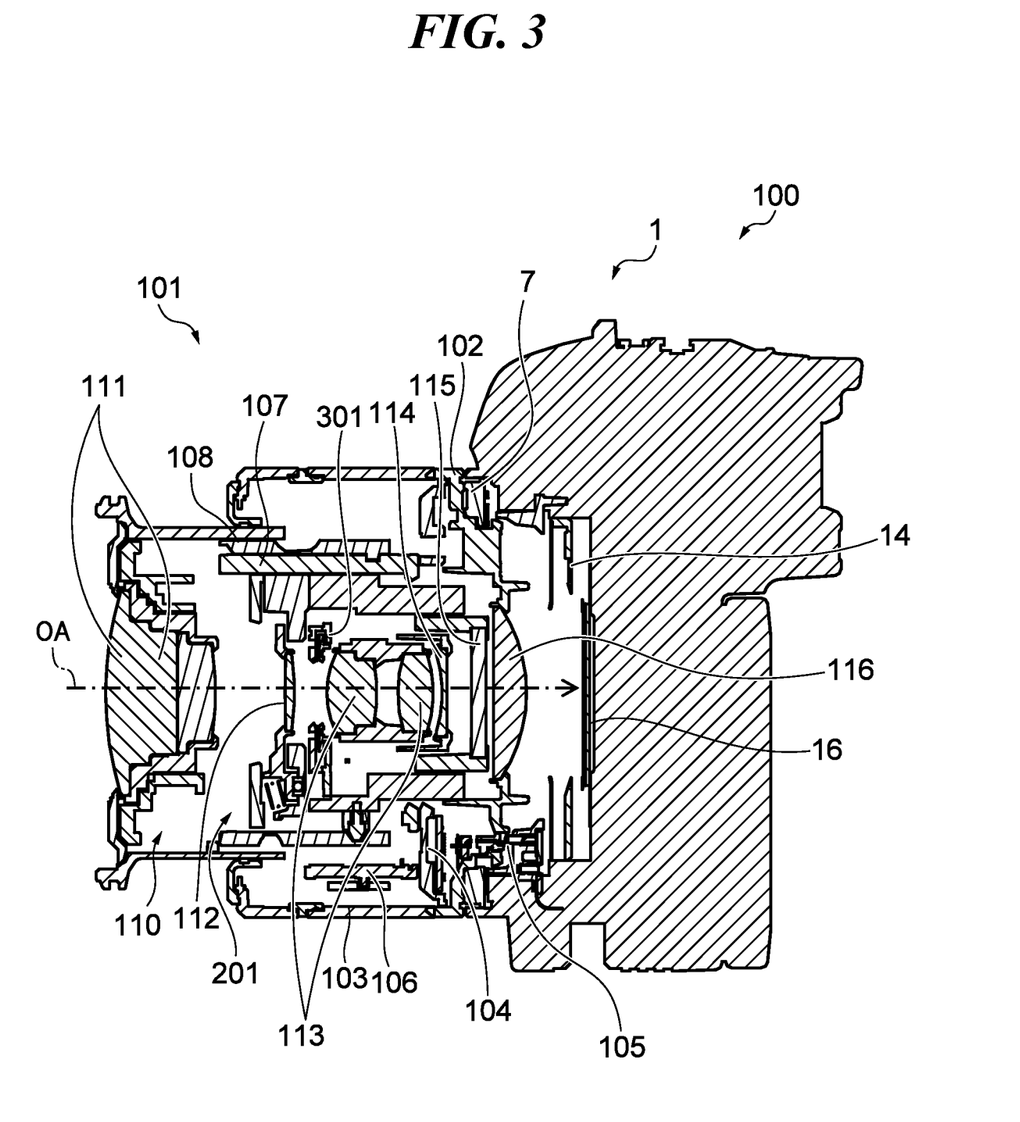
FIG. 3 is a cross-sectional view that shows an interchangeable lens (located at a wide-angle end on a short focus side at the time of zooming) in the digital camera shown in FIGS. 1A and 1B.
Figure 4:
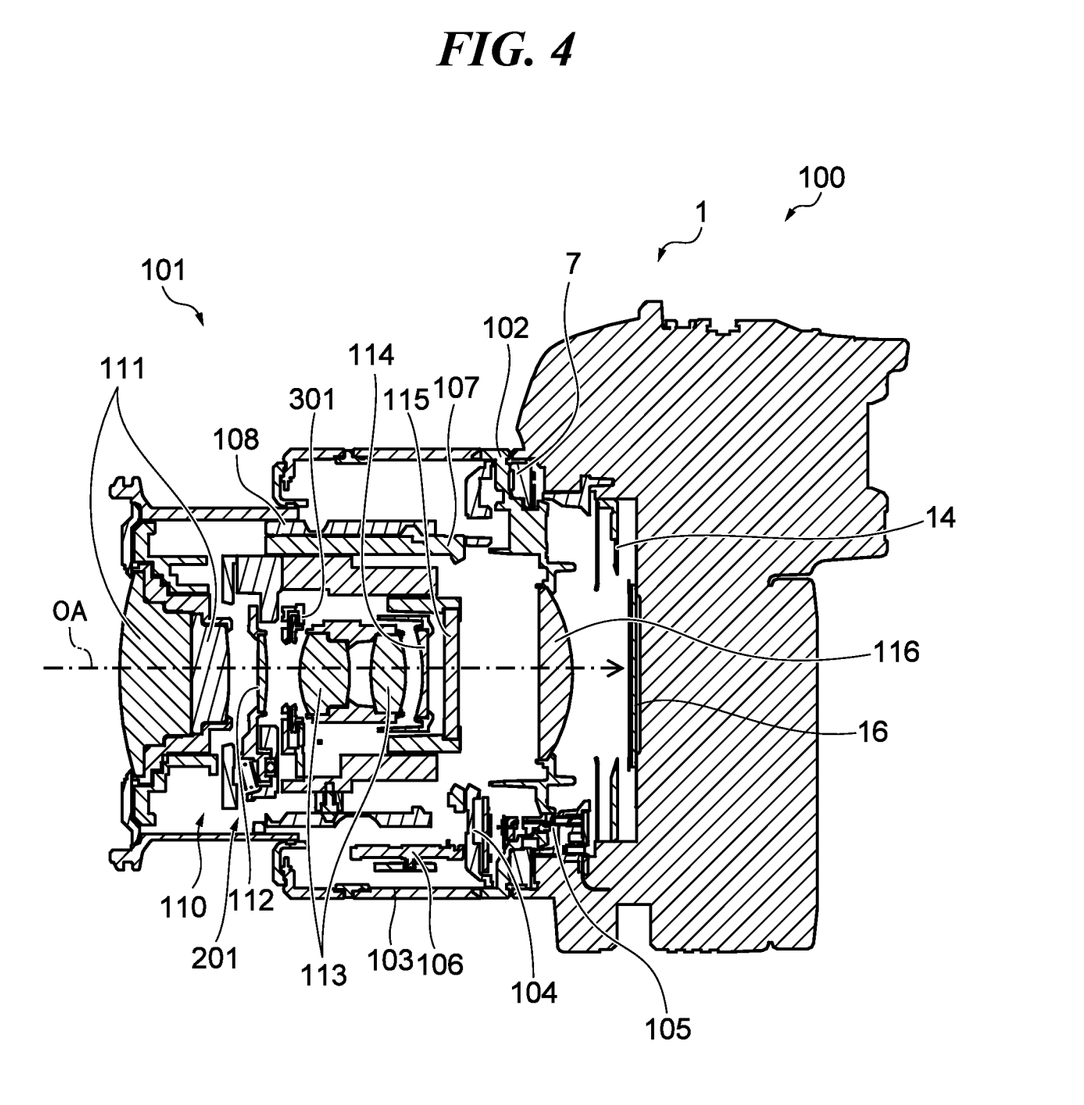
FIG. 4 is a cross-sectional view that shows the interchangeable lens (located at a telephoto end on a long focus side at the time of zooming) in the digital camera shown in FIGS. 1A and 1B.

The positional relationship of the main components in the interchangeable lens 101 will be described with reference to FIGS. 3 and 4. FIGS. 3 and 4 are cross-sectional views on an XY plane including the optical axis OA, respectively. Since each of center lines shown in FIGS. 3 and 4 substantially coincides with the optical axis OA determined by the image pickup optical system, hereinafter, it is synonymous with the optical axis OA.

As shown in FIGS. 3 and 4, the interchangeable lens 101 includes the zoom group 110 that constitutes the image pickup optical system. The zoom group 110 is a lens unit that includes at least one lens, and in the present preferred embodiment, as one example, adopts a six-group configuration. The zoom group 110 is configured to include a first zoom group 111, the lens image stabilization group 112 that functions as a second zoom group, a third zoom group 113, the focus group 114 that functions as a fourth zoom group, a fifth zoom group 115, and a sixth zoom group 116. The first zoom group 111 to the sixth zoom group 116 are disposed in order from the front along the optical axis OA. Further, among the first zoom group 111 to the sixth zoom group 116, the lens image stabilization group 112 to the fifth zoom group 115 move between different positions at a wide-angle end (see FIG. 3) and at a telephoto end (see FIG. 4). By this movement, the light from the subject can be image-formed on the image pickup element 16. Moreover, the configuration of the image pickup optical system is not limited to the above configuration, and for example, the lens image stabilization group 112 and the focus group 114 may function as other zoom groups.

The interchangeable lens 101 includes a straight moving guide barrel 107 and a cam barrel 108. The straight moving guide barrel 107 is fixed to the lens mount 102 via a fixed barrel (not shown). Further, the straight moving guide barrel 107 is configured by a cylindrical body that has a cylindrical shape. Furthermore, a plurality of cam grooves (not shown) is formed on an outer peripheral surface of the straight moving guide barrel 107 so as to be disposed at equal intervals along a circumferential direction of the outer peripheral surface of the straight moving guide barrel 107. The cam barrel 108 has a cylindrical shape, and is disposed concentrically with the straight moving guide barrel 107 on the outside of the straight moving guide barrel 107 with the optical axis OA as the center. Further, a cam follower (not shown) that is engaged with each of the cam grooves of the straight moving guide barrel 107 is provided on an inner peripheral surface of the cam barrel 108. Furthermore, the cam barrel 108 is coupled with the zoom operation ring 103 via a key (not shown). By rotationally operating the zoom operation ring 103, the cam followers are guided by the cam grooves, and the cam barrel 108 moves forward and backward (advances and retreats) along the optical axis direction while rotating around the optical axis OA.

Figure 5:
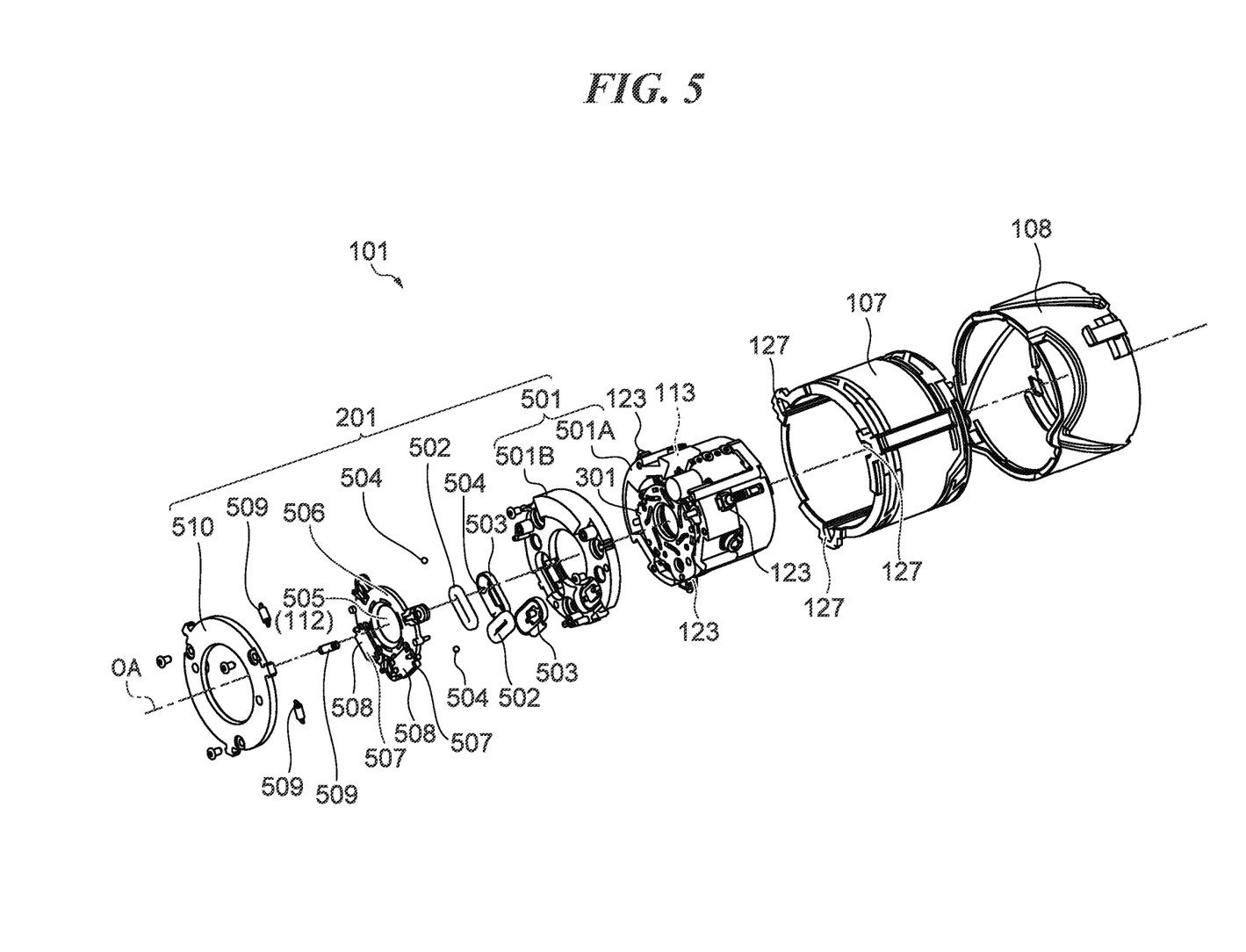
FIG. 5 is an exploded perspective view of an image stabilization drive unit of the interchangeable lens in the digital camera shown in FIGS. 1A and 1B and its peripheral members.

The lens image stabilization group 112 to the fifth zoom group 115 (the zoom group 110) are supported by the inside of the straight moving guide barrel 107. Further, straight moving guide grooves 127 are provided on an inner peripheral surface (an inner peripheral portion) of the straight moving guide barrel 107 along the optical axis direction (see FIG. 5). A plurality of the straight moving guide grooves 127 is disposed at equal intervals along a circumferential direction of the inner peripheral surface of the straight moving guide barrel 107. Moreover, the number of the straight moving guide grooves 127 disposed is preferably three, but is not limited to this, and may be two or four or more. The straight moving guide grooves 127 regulate the rotations of the lens image stabilization group 112 to the fifth zoom group 115 around the optical axis OA, and are cam grooves that carry out straight moving of the lens image stabilization group 112 to the fifth zoom group 115 along the optical axis direction. Further, the cam barrel 108 is provided with cam grooves having trajectories of different angles in the rotation direction corresponding to the lens image stabilization group 112 to the fifth zoom group 115. A plurality of the cam grooves is disposed at equal intervals along a circumferential direction of the cam barrel 108. On the other hand, the zoom group 110 is provided with a plurality of cam followers, and each of the plurality of cam followers is engaged with the corresponding straight moving guide groove 127 and the corresponding cam groove, respectively. The cam barrel 108 is rotated by the user rotationally operating the zoom operation ring 103. At this time, the cam followers are guided by the straight moving guide grooves 127 and the cam grooves. As a result, the lens image stabilization group 112 to the fifth zoom group 115 move forward and backward (advance and retreat) along the optical axis direction while the rotations of the lens image stabilization group 112 to the fifth zoom group 115 around the optical axis OA are regulated. As shown in FIG. 5, straight moving guides (engaging portions) 123 as the above cam followers are disposed in the third zoom group 113. Further, the straight moving guides 123 are protruded toward a direction away from the optical axis OA. Furthermore, the straight moving guides 123 are disposed in the same number as the straight moving guide grooves 127, and each of the straight moving guides 123 is engaged with each of the straight moving guide grooves 127, respectively. As a result, the rotation of the third zoom group 113 around the optical axis OA is regulated.

Further, the straight moving guide barrel 107 supports the image stabilization drive unit 201 together with the lens image stabilization group 112 to the fifth zoom group 115 (the zoom group 110) by the inside thereof. As described above, when reducing the image blur, the image stabilization drive unit 201 can move the lens image stabilization group 112 (the zoom group 110) to the target position in an orthogonal direction orthogonal to the optical axis OA, that is, in the Z/Y axis direction. As shown in FIG. 5, the image stabilization drive unit 201 includes a base member 501, coils 502, shield cases 503, balls (rolling balls) 504, a shift member 506, magnets 507, yokes 508, springs 509, and a floating stopper member 510.

In the present preferred embodiment, the base member 501 is configured by a cylindrical housing member 501A that houses the third zoom group 113, and a ring-shaped member 501B that is coupled with the front of the housing member 501A (one side in the optical axis direction). Further, the straight moving guides 123 are provided on the housing member 501A. By the straight moving guides 123 being guided by the straight moving guide grooves 127, the base member 501 becomes movable in the optical axis direction. Moreover, although the base member 501 is configured by two members in the present preferred embodiment, the base member 501 is not limited to being configured by two members, and may be configured by, for example, one member or three or more members.

The two coils 502 are fixed in the front of the base member 501. Each of the two coils 502 has conductivity and is electrically connected to the lens control unit 104. Further, each of the two coils 502 functions as a voice coil type actuator by being energized by the lens control unit 104 (i.e., by becoming an energized state by the lens control unit 104). As a result, it is possible to move the shift member 506 in the Z/Y axis direction with respect to the base member 501 together with a lens 505 described later. Further, each of the shield cases 503 is disposed between each of the two coils 502 and the base member 501. Each of the shield cases 503 is coupled with the base member 501. Furthermore, each of the shield cases 503 covers the rear of the coil 502 (the image pickup plane side), and the front of the coil 502 (the object side) is open.

The shift member 506 is disposed in the front of the base member 501 via the coils 502 and the shield cases 503. Further, the shift member 506 has a ring shape, and holds the lens 505, which constitutes the lens image stabilization group 112 (the zoom group 110), in the inside thereof. The three balls 504 are disposed at equal angle intervals around the optical axis OA between the base member 501 and the shift member 506. Each of the three balls 504 is in contact with the base member 501 and the shift member 506, respectively. When the shift member 506 moves in the Z/Y axis direction with respect to the base member 501, each of the three balls 504 rolls between the base member 501 and the shift member 506, so that the shift member 506 is smoothly moved (the movement of the shift member 506 is smoothly performed). Moreover, the balls 504 are made of a non-magnetic material such as SUS304, which is an austenitic stainless steel.

The two magnets 507 are fixed in the front of the shift member 506. Each of the two magnets 507 is disposed to face each of the two coils 502 in the optical axis direction, and the Lorentz force is generated between each of the two magnets 507 and the coil 502 which is in the energized state. Further, the yoke 508 is coupled with each of the two magnets 507. The yokes 508 are made of a magnetic material such as SPCC (Steel Plate Cold Commercial), and some of them concentrate magnetic flux.

Figure 9:
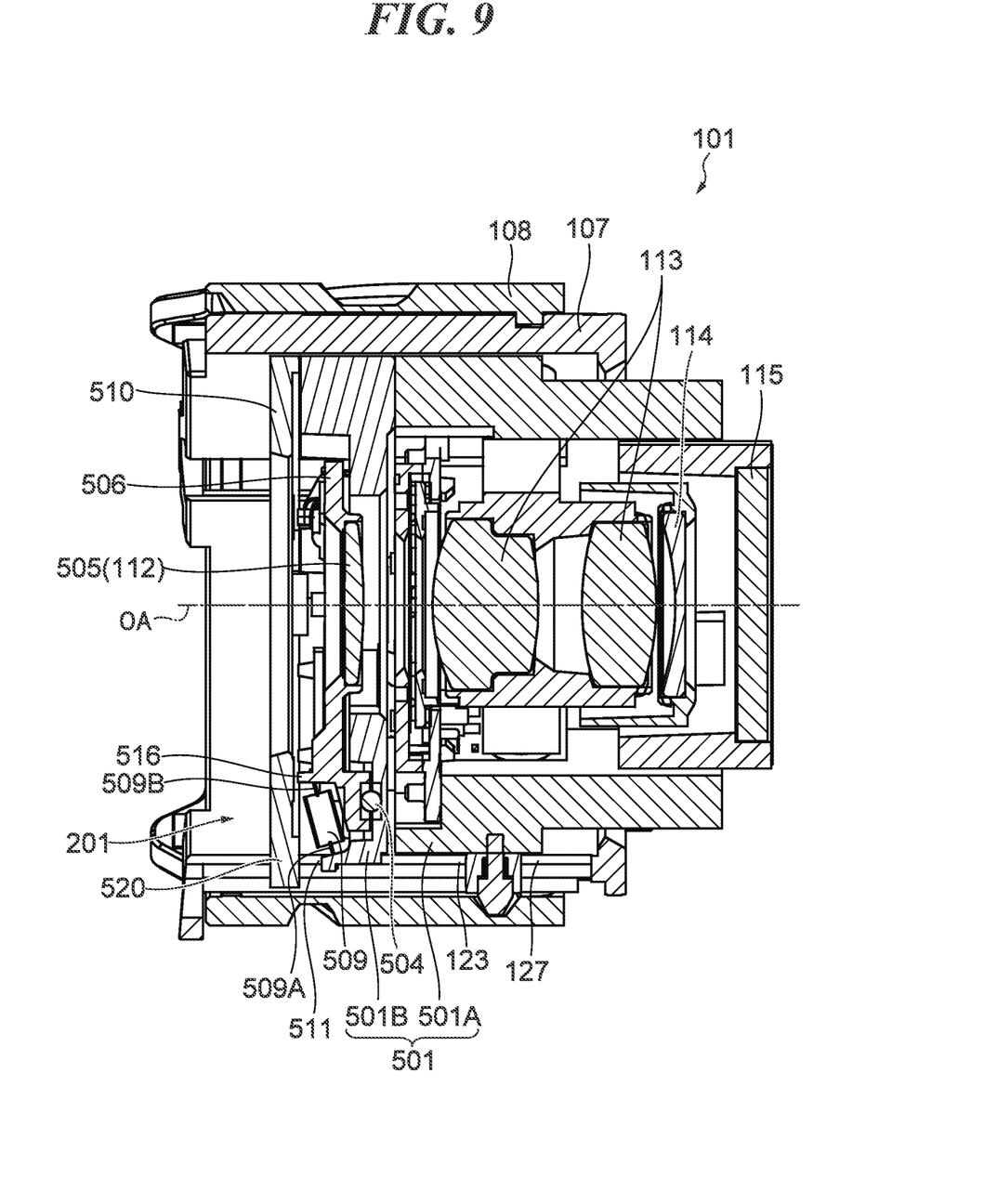
FIG. 9 is a cross-sectional view taken along a line B-B of FIG. 8.

The spring 509 is an urging member that couples the base member 501 and the shift member 506 and urges the shift member 506 with respect to the base member 501 side. In the present preferred embodiment, the three springs 509 are disposed at equal angle intervals around the optical axis OA (see FIG. 6). As a result, it is possible to stably urge the shift member 506 with respect to the base member 501 side. Moreover, the number of the springs 509 disposed is preferably three, but is not limited to this, and for example, may be two or four or more. Further, in the present preferred embodiment, the spring 509 is a tension coil spring and has hooks (a hook 509A and a hook 509B) at both end portions thereof. As shown in FIG. 7 and FIG. 9, the hook 509A at one end portion is engaged with and coupled with a spring hooking portion (a first coupling portion) 511 of the base member 501, and the hook 509B at another end portion is engaged with and coupled with a spring hooking portion (a second coupling portion) 516 of the shift member 506. As a result, it is possible to urge the shift member 506 with respect to the base member 501 side by a simple configuration of the tension coil spring. Further, an angle θ509 formed by a central axis O509 of the spring 509 and the optical axis OA is preferably more than 0 degrees and less than 90 degrees, is more preferably 70 degrees or more and 80 degrees or less, and is still more preferably 75 degrees or less. As a result, the shift member 506 is urged with respect to the base member 501 without excess and deficiency, and is disposed at a position where tensile forces of the three springs 509 are balanced. Moreover, the springs 509 are made of a non-magnetic material such as SUS304, which is the austenitic stainless steel. Further, in recent years, the total length of the spring 509 tends to be longer in a diameter direction of the interchangeable lens 101.

The floating stopper member 510 is disposed in the front of the shift member 506 via the springs 509. The floating stopper member 510 is a regulating member that regulates the movement of the shift member 506 in a direction in which the shift member 506 is separated from the base member 501, that is, the floating stopper member 510 is the regulating member that regulates floating of the shift member 506 in the optical axis direction. As a result, it is possible to reduce an inadvertent movement of the shift member 506 due to, for example, a drop impact. The floating stopper member 510 is configured by a ring-shaped member, and is disposed concentrically with the base member 501 and the shift member 506 with the optical axis OA as the center.

By the way, when the user operates the zoom operation ring 103 of the interchangeable lens 101, it is desired to realize the miniaturization of the interchangeable lens 101, particularly, it is desired to realize the miniaturization (reducing the diameter) of the diameter direction of the interchangeable lens 101. As a result, the operability of the zoom operation ring 103 is improved. The digital camera 100 adopts a configuration that the interchangeable lens 101 is miniaturized. Hereinafter, this configuration and effects achieved by this configuration will be described.

As shown in FIG. 7 and FIG. 9, the ring-shaped member 501B of the base member 501 includes the spring hooking portion 511 with which the hook 509A of each of the springs 509 is engaged and coupled. The spring hooking portion 511 extends from an outer peripheral portion (an edge portion) of the ring-shaped member 501B along the optical axis direction, and is provided so as to be protruded forward in the present preferred embodiment. As a result, the spring hooking portion 511 is configured so that the hook 509A can be easily engaged. Further, after this engagement, the hook 509A is prevented from being easily disengaged from the spring hooking portion 511.

The shift member 506 includes the spring hooking portion 516 with which the hook 509B of each of the springs 509 is engaged and coupled. The spring hooking portion 516 extends from between an inner peripheral portion and an outer peripheral portion of the ring-shaped shift member 506 along the optical axis direction. As a result, the spring hooking portion 516 is configured so that the hook 509B can be easily engaged. Further, after this engagement, the hook 509B is prevented from being easily disengaged from the spring hooking portion 516.

Figure 6:
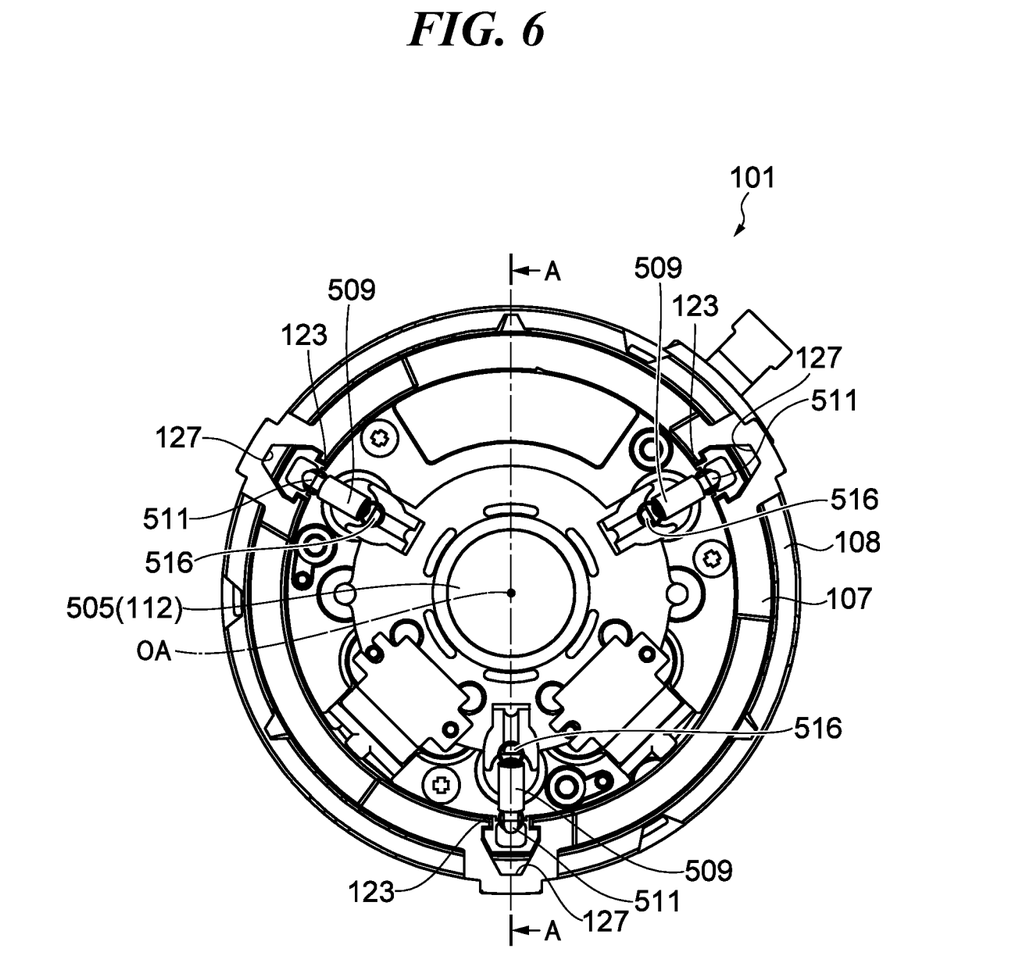
FIG. 6 is a front view of the interchangeable lens shown in FIG. 5 when viewed from an object side (a floating stopper member is not shown in FIG. 6).
Figure 7:
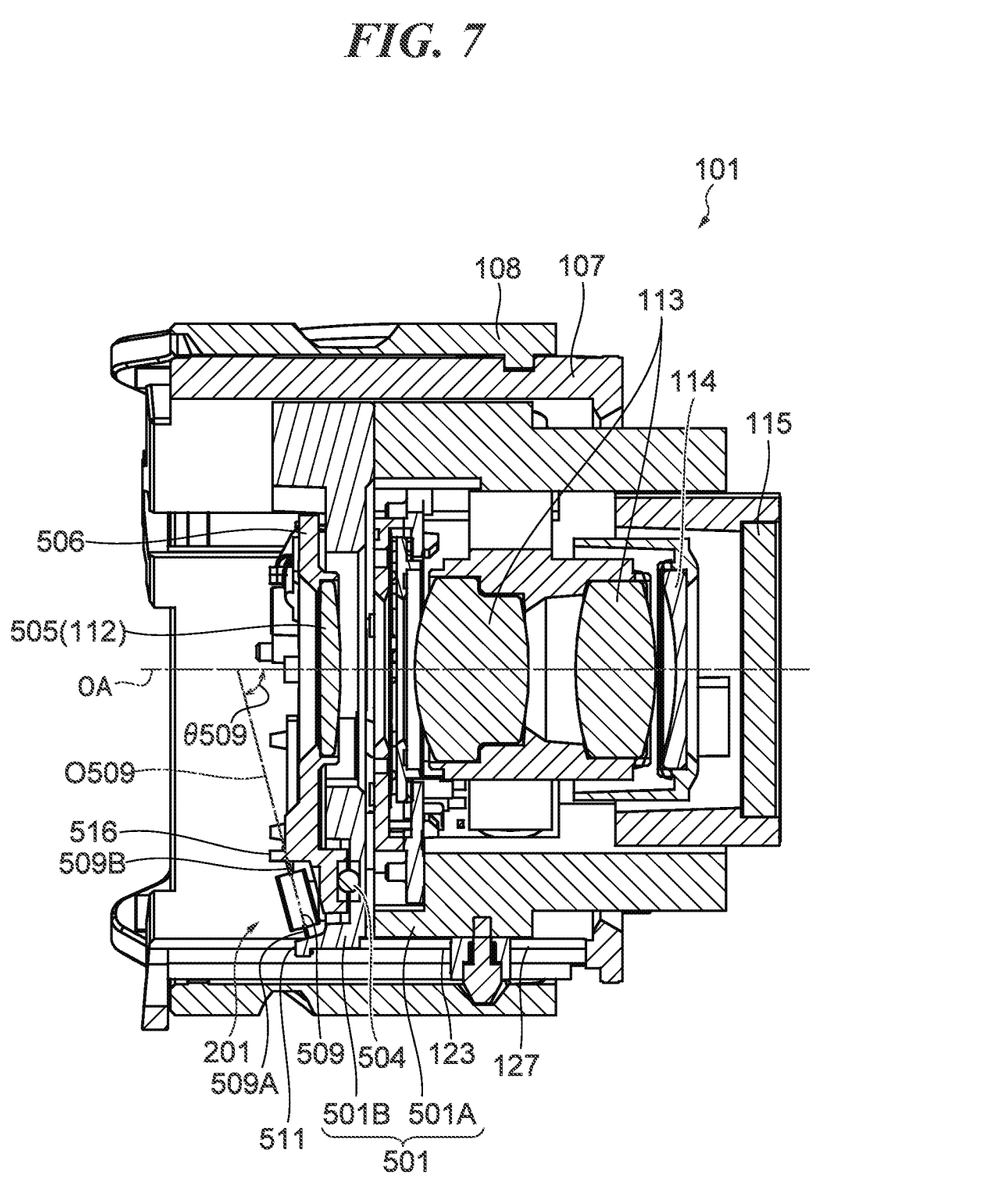
FIG. 7 is a cross-sectional view taken along a line A-A of FIG. 6.

As shown in FIG. 6, when viewed from the optical axis direction, each spring hooking portion 511 of the base member 501 is located within the straight moving guide groove 127 of the straight moving guide barrel 107. Further, as shown in FIG. 7 in the case of changing the point of view, when viewed from a direction orthogonal to the optical axis OA (hereinafter, simply referred to as "an orthogonal direction"), the spring hooking portion 511 is disposed so as to overlap with the straight moving guide groove 127. Since the spring hooking portion 511 is disposed so as to enter into the straight moving guide groove 127 in this way, the minimum inner diameter of the straight moving guide barrel 107 can be set smaller than a diameter of a virtual circle passing through each spring hooking portion 511 of the base member 501. As a result, the miniaturization of the diameter direction of the interchangeable lens 101 is realized, that is, the diameter of the interchangeable lens 101 is reduced, and thus the operability of the interchangeable lens 101 is improved. As described above, in the interchangeable lens 101, the straight moving guide groove 127 functions not only as a cam groove of the straight moving guide 123 but also as a housing portion that houses the spring hooking portion 511.

As shown in FIG. 6 and FIG. 7, the spring hooking portion 511 is located distal to the optical axis OA than the spring hooking portion 516, that is, the spring hooking portion 511 is located radially outside the interchangeable lens 101 than the spring hooking portion 516. Since the movement in the orthogonal direction of the base member 501 is regulated, as a matter of course, the movement in the orthogonal direction of the spring hooking portion 511 extended to the base member 501 is also regulated. On the other hand, since the shift member 506 is movable in the orthogonal direction, as a matter of course, the spring hooking portion 516 extended to the shift member 506 is also movable in the orthogonal direction. Therefore, in a case that the spring hooking portion 511 of the base member 501 is disposed within the straight moving guide groove 127 as described above (hereinafter, this case is referred to as "the former case"), it is not necessary to secure a space in the straight moving guide groove 127 for the spring hooking portion 511 to move in the orthogonal direction. On the other hand, in a case that the spring hooking portion 516 of the shift member 506 is disposed within the straight moving guide groove 127 (hereinafter, this case is referred to as "the latter case"), it is necessary to secure a space in the straight moving guide groove 127 for the spring hooking portion 516 to move in the orthogonal direction. The present preferred embodiment adopts a configuration in the former case that the spring hooking portion 511 of the base member 501 is disposed within the straight moving guide groove 127. Compared to a configuration in the latter case that the spring hooking portion 516 of the shift member 506 is disposed within the straight moving guide groove 127, an effect achieved by this configuration in the former case is to be capable of suppressing the width and depth of the straight moving guide groove 127. This effect contributes to reducing the diameter of the interchangeable lens 101.

Figure 8:
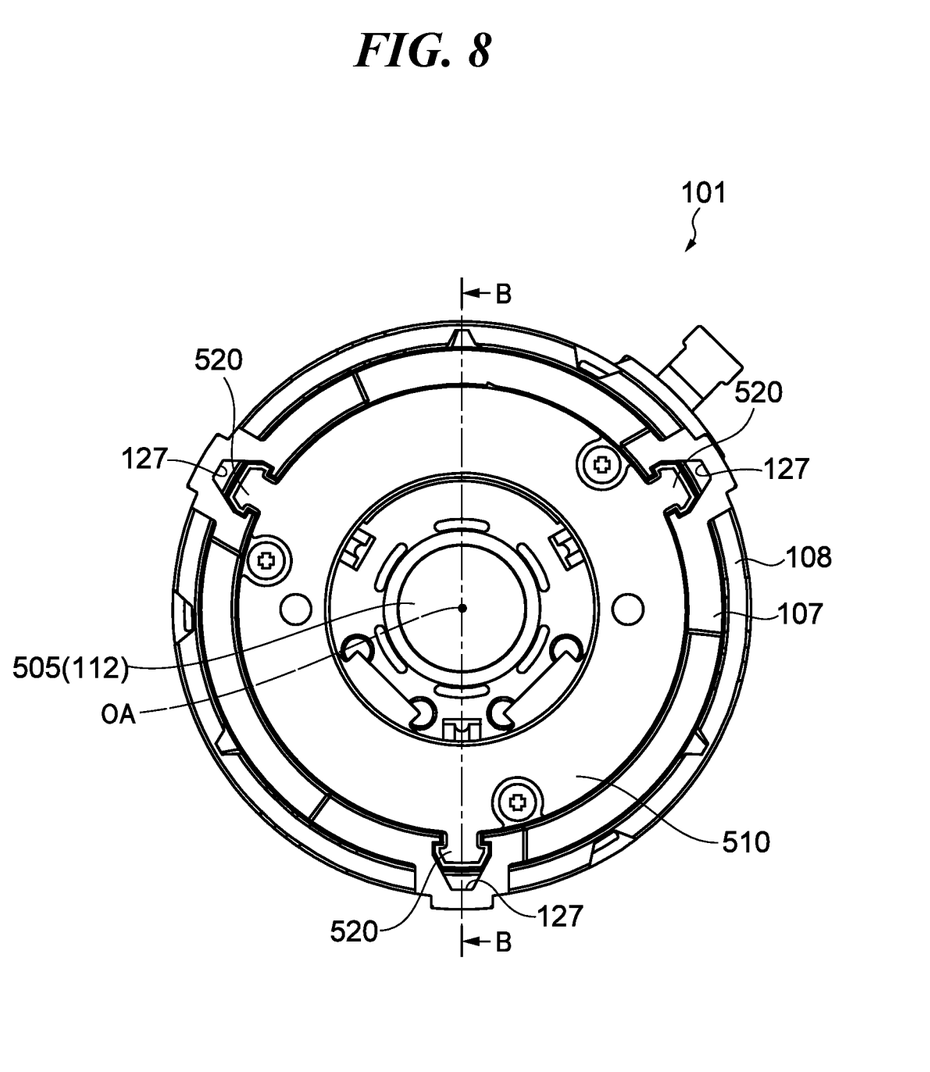
FIG. 8 is a front view of the interchangeable lens shown in FIG. 5 when viewed from the object side (the floating stopper member is shown in FIG. 8).

As shown in FIG. 8, the floating stopper member 510 includes extending portions 520 extending radially outward from an outer peripheral portion (an edge portion) thereof, that is, the floating stopper member 510 includes the extending portions 520 protruding radially outward from the outer peripheral portion (the edge portion) thereof. Further, the extending portions 520 are disposed in the same number as the straight moving guide grooves 127, and each of the extending portions 520 enters into each of the straight moving guide grooves 127, respectively, and covers the middle of the straight moving guide groove 127. Furthermore, the extending portion 520 overlaps with the spring hooking portion 511 of the base member 501 and the spring 509 in the optical axis direction. As shown in FIG. 9, when viewed from the orthogonal direction, the extending portion 520 (at least a part of the extending portion 520) of the floating stopper member 510 is disposed so as to overlap with the straight moving guide groove 127. Further, the spring hooking portion 511 of the base member 501 and the spring 509 are disposed between the extending portion 520 and the straight moving guide 123 in the optical axis direction. As a result, it is possible to reduce stray light from the first zoom group 111 to the image pickup element 16, which directly passes through the straight moving guide groove 127. Further, it is also possible to reduce stray light to the image pickup element 16, which is reflected by the spring 509 and passes through the straight moving guide groove 127.

Although the preferred embodiments of the present invention have been described above, the present invention is not limited to the above-described embodiments, and various modifications and changes can be made within the scope of the gist thereof. For example, the spring 509 is not limited to the tension coil spring, and may be, for example, a linear or strip-shaped stretchable rubber material. Further, the image stabilization drive unit 201 may be configured such that the coils 502 are coupled with the shift member 506 and the magnets 507 are coupled with the base member 501.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-131300, filed Aug. 11, 2021, which is hereby incorporated by reference herein in its entirety.

What is claimed is:

1. An optical apparatus comprising:
a lens unit;
a drive unit configured to include a base member, a shift member, and an urging member;
a cylindrical body configured to support the drive unit; and
a first coupling portion configured to be coupled with the urging member,
wherein a groove along a direction of an optical axis of the lens unit is provided inside the cylindrical body,
the urging member urges the shift member with respect to the base member, and
the first coupling portion and the groove overlap with each other when viewed from the direction of the optical axis.

2. The optical apparatus according to claim 1, wherein a plurality of the lens units is provided in the optical apparatus.

3. The optical apparatus according to claim 1, wherein the drive unit includes a plurality of the urging members.

4. The optical apparatus according to claim 3, wherein a plurality of the grooves is provided inside the cylindrical body, and the number of the grooves is the same as the number of the urging members.

5. The optical apparatus according to claim 1, wherein the drive unit is capable of moving at least the lens unit in a direction orthogonal to the optical axis.

6. The optical apparatus according to claim 5, wherein the shift member is movable in the direction orthogonal to the optical axis.

7. The optical apparatus according to claim 1, wherein the groove is provided along a direction parallel to the optical axis.

8. The optical apparatus according to claim 1, wherein the first coupling portion is provided on the base member.

9. The optical apparatus according to claim 1, wherein a second coupling portion configured to be coupled with the urging member is provided on the shift member.

10. The optical apparatus according to claim 9, wherein the urging member has hooks at both ends, one of the hooks is capable of being engaged with the first coupling portion, and the other of the hooks is capable of being engaged with the second coupling portion.

11. The optical apparatus according to claim 9, wherein the first coupling portion is located distal to the optical axis than the second coupling portion.

12. The optical apparatus according to claim 1, wherein the urging member is a tension coil spring.

13. The optical apparatus according to claim 1, wherein an angle formed by a central axis of the urging member and the optical axis is more than 0 degrees and less than 90 degrees.

14. The optical apparatus according to claim 1, wherein the drive unit includes a regulating member configured to regulate a movement of the shift member in a direction in which the shift member is separated from the base member, and
at least a part of the regulating member overlaps with the groove in a direction orthogonal to the optical axis.

15. The optical apparatus according to claim 14, wherein the first coupling portion is provided between an engaging portion, which is engaged with the groove, and the regulating member.

16. The optical apparatus according to claim 1, wherein the first coupling portion is inside the groove when viewed from the direction of the optical axis.

17. The optical apparatus according to claim 1, wherein the optical apparatus is a lens barrel.

* * * * *